United States Patent
Ozaki et al.

(10) Patent No.: US 7,551,229 B2
(45) Date of Patent: Jun. 23, 2009

(54) AUTOMATIC CHANNEL SELECTION METHOD AND APPARATUS IN UNSTABLE DIGITAL CHANNEL ENVIRONMENTS

(75) Inventors: Arthur H. Ozaki, Escondido, CA (US); Michael Donald McDermott, Escondido, CA (US); Peter Shintani, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 578 days.

(21) Appl. No.: 10/917,989

(22) Filed: Aug. 13, 2004

(65) Prior Publication Data
US 2006/0033846 A1  Feb. 16, 2006

(51) Int. Cl.
*H04N 5/46* (2006.01)
*H04N 5/44* (2006.01)
(52) U.S. Cl. .................. 348/558; 348/555; 348/731
(58) Field of Classification Search .......... 348/558, 348/555, 554, 189, 731–733, 725; H04N 5/46, H04N 5/44
See application file for complete search history.

(56) References Cited

U.S. PATENT DOCUMENTS

| | | | |
|---|---|---|---|
| 5,132,793 A * | 7/1992 | Hirahata et al. | |
| 5,461,427 A * | 10/1995 | Duffield et al. | |
| 5,532,748 A * | 7/1996 | Naimpally | |
| 5,801,790 A | 9/1998 | Limberg | |
| 5,926,228 A * | 7/1999 | Jeon et al. | |
| 5,995,135 A * | 11/1999 | Limberg | 348/607 |
| 6,014,178 A * | 1/2000 | Jeon et al. | |
| 6,046,781 A | 4/2000 | LeRoy | |
| 6,091,458 A * | 7/2000 | Jeon et al. | |
| 6,184,942 B1 * | 2/2001 | Patel et al. | |
| 6,307,595 B1 | 10/2001 | Limberg | |
| 6,369,857 B1 * | 4/2002 | Balaban et al. | |
| 6,741,293 B1 | 5/2004 | Obuchi | |
| 6,862,325 B2 * | 3/2005 | Gay-Bellile et al. | 348/554 |
| 6,952,182 B2 * | 10/2005 | Spilker et al. | 342/464 |

(Continued)

FOREIGN PATENT DOCUMENTS

EP  0847192 A1  6/1998

(Continued)

OTHER PUBLICATIONS

Patent Cooperation Treaty, PCT International Preliminary Report on Patentability, PCT/US2005/027952, mail date Feb. 22, 2007, 6 pages.

(Continued)

*Primary Examiner*—Sherrie Hsia
(74) *Attorney, Agent, or Firm*—Fitch, Even, Tabin & Flannery

(57) ABSTRACT

An apparatus comprising a tuner module configured to demodulate a first television signal and a second television signal that corresponds to the first television signal; and a controller electronically coupled to the tuner module, the controller configured to compare a value of a first variable to a threshold level, the value of the first variable related to a quality of the first television signal; wherein the controller switches from outputting for display the first television signal to outputting for display the second television signal that corresponds to the first television signal in response to comparing the value of the first variable to the threshold level.

17 Claims, 4 Drawing Sheets

U.S. PATENT DOCUMENTS

| | | | |
|---|---|---|---|
| 6,956,812 B2 * | 10/2005 | Okada et al. | 375/260 |
| 7,061,542 B1 * | 6/2006 | Ikeguchi | 348/558 |
| 7,106,382 B2 * | 9/2006 | Shiotsu | 348/555 |
| 7,202,914 B2 * | 4/2007 | Wu et al. | 348/723 |
| 2003/0151698 A1 * | 8/2003 | Ishihara et al. | |
| 2004/0004674 A1 * | 1/2004 | Birleson | |

FOREIGN PATENT DOCUMENTS

EP    0847192 B1    8/2002

OTHER PUBLICATIONS

PCT Written Opinion of the International Searching Authority, Feb. 27, 2006, PCT/US05/27952.

* cited by examiner

AUTOMATIC CHANNEL SELECTION METHOD AND APPARATUS IN UNSTABLE DIGITAL CHANNEL ENVIRONMENTS

BACKGROUND OF THE INVENTION

1. Field of the Invention

The present invention relates generally to television signals. Even more specifically, the present invention relates to a system and method for switching from a first television signal to a corresponding second television signal upon loss or interruption of the first television signal.

2. Discussion of the Related Art

Reception and display of digital television signals delivers significant improvements in audio and picture quality as compared to the receipt and display of analog signals. However, there are several disadvantages in the reception of digital signals. For example, the transmission signal strength and signal stability can cause the digital signal to drop below a threshold level such that the signal can not be displayed or is poorly displayed.

The quality of digital signals in terms of strength and stability depends on the proximity, direction, height and transmission power of the digital signal transmission center. Additionally, physical objects in the line of sight (e.g., aircraft), weather and unstable cable infrastructure also affect the signal level as well as their robustness (i.e., steady state signal level). When the digital signal interrupted such that the digital signal can not be display, a user has to adjust the antenna or tune the television to an associated analog channel in order to continue watching the current programming or wait until the digital signal returns. This can be a time consuming and inconvenient process during which time a person watching the television may miss an important part of the programming.

SUMMARY OF THE INVENTION

The different embodiments described herein address the above mentioned needs as well as other needs by providing a method and apparatus for switching between digital and an analog television signal upon detection of a loss in the signal quality of the digital television signal.

One embodiment can be characterized as a method comprising receiving a first television signal; outputting the first television signal; comparing a value of a first variable to a threshold level, the first variable related to the first television signal; and outputting a second television signal that corresponds to the first television signal in response to comparing the value of the first variable to the threshold level.

Another embodiment can be characterized as a method comprising receiving a first television signal including a first audio portion and a first video portion; receiving a second television signal including a second audio portion and a second video portion; comparing a value of a first variable to a threshold level, the first variable related to the first television signal; outputting one of the first audio portion and the first video portion in response to the comparing the value of the first variable to the threshold level; and outputting one of the second audio portion and the second video portion in response to the comparing the value of the first variable to the threshold level.

A further embodiment may be characterized as an apparatus comprising a tuner for demodulating a first television signal; and a controller electronically coupled to the tuner, the controller configured to compare a value of a first variable to a threshold level, the value of the first variable related to a quality of the first television signal; wherein the controller switches from outputting for display the first television signal to outputting for display a second television signal that corresponds to the first television signal in response to comparing the value of the first variable to the threshold level.

Yet another embodiment may be characterized as an apparatus comprising a tuner module configured to demodulate a first television signal and a second television signal that corresponds to the first television signal; and a controller electronically coupled to the tuner module, the controller configured to compare a value of a first variable to a threshold level, the value of the first variable related to a quality of the first television signal; wherein the controller switches from outputting for display the first television signal to outputting for display the second television signal that corresponds to the first television signal in response to comparing the value of the first variable to the threshold level. In one preferred embodiment, a plurality of variables are compared to a plurality of threshold levels.

BRIEF DESCRIPTION OF THE DRAWINGS

The above and other aspects, features and advantages of the present invention will be more apparent from the following more particular description thereof, presented in conjunction with the following drawings wherein.

Figure 1:
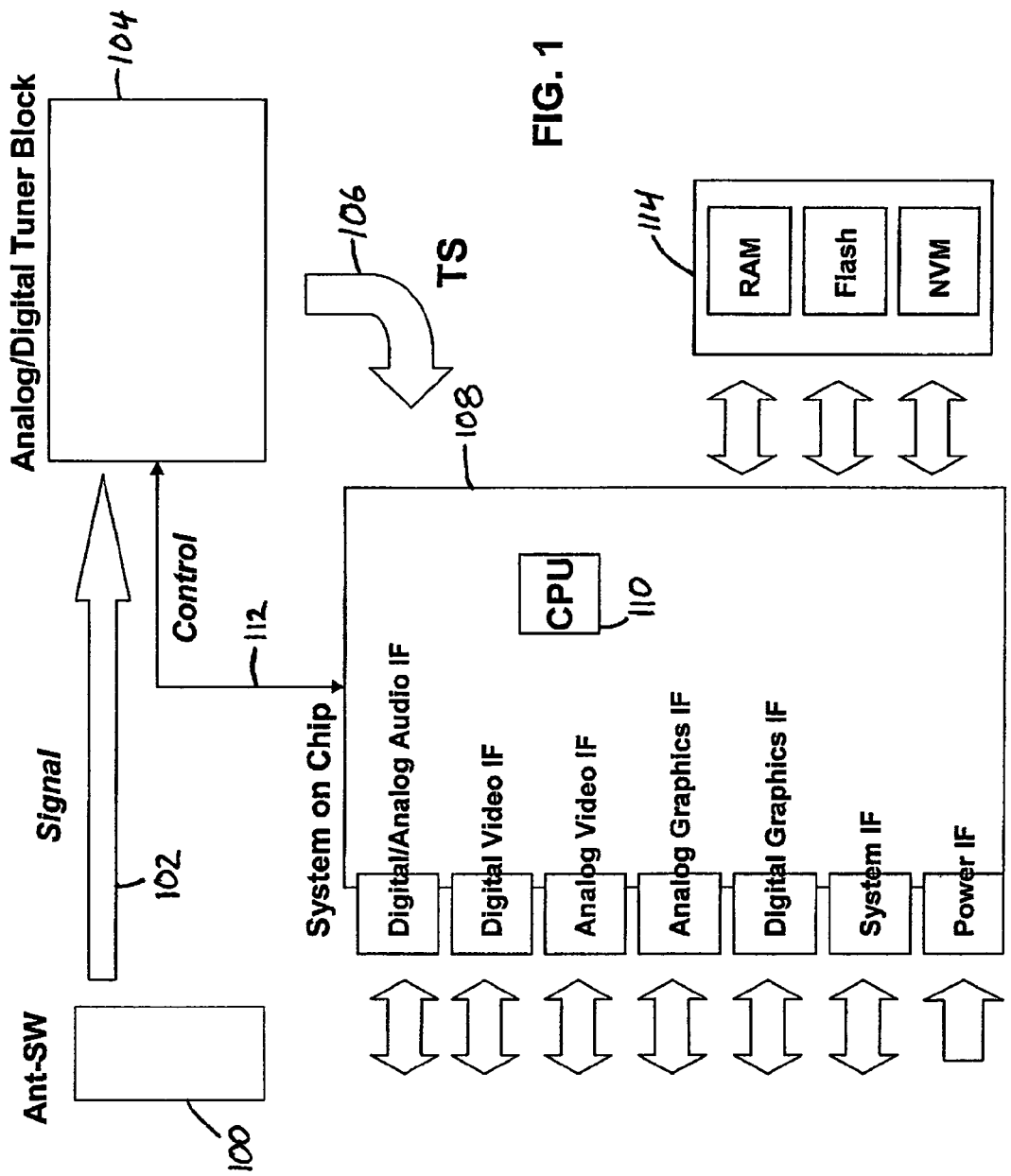
FIG. 1 is a block diagram illustrating a hardware configuration of a television in accordance with one embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions, sizing, and/or relative placement of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is usually accorded to such terms and expressions by those skilled in the corresponding respective areas of inquiry and study except where other specific meanings have otherwise been set forth herein.

DETAILED DESCRIPTION

The following description is not to be taken in a limiting sense, but is made merely for the purpose of describing the general principles of the invention. The scope of the invention should be determined with reference to the claims.

Referring to FIG. 1 a block diagram is shown illustrating a hardware configuration of a television in accordance with one embodiment. Shown is an antenna switch 100, an input signal 102, a tuner 104, a transport stream 106, a system on chip 108, a processor 110, a control line 112, and memory devices 114.

The antenna switch 100 is electrically coupled to the tuner 104 such that television signals can be sent to the tuner 104. The tuner 104 is electrically coupled to the system on chip 104 through both the transport stream 106 and the control line 112. The processor 110 is part of the system on chip 108. The system on chip 108 is also electrically coupled to the memory devices 114.

In operation, a television signal (e.g., cable or terrestrial) is received by the antenna switch 100. The input signal 102 is then sent to the tuner 104. The tuner 104, in one embodiment, is capable of demodulating Advanced Television Systems Committee (ATSC), Quadrature Amplitude Modulation (QAM) and National Television System Committee (NTSC) signals. The processor 110 sends commands and receives information from the tuner 104 through the control line 112. The processor controls the operation of the tuner 104 through the control line 112 and reads back status information from the tuner 104 to the processor 110. This will be described in greater detail herein with reference to FIG. 2. Video and audio content is sent over the transport stream 106 after it has been demodulated by the tuner 104 and is received by the system on chip 108. The video and audio content is then output for display on a display screen. The system on chip 108, in one embodiment, is a single integrated circuit that controls the entire operation of the television including the tuner 104.

As described, the tuner 104 includes both a digital tuner and an analog tuner and has the ability to demodulate ATSC signals, QAM signals and NTSC signals. Alternatively, the tuner 104 only includes a digital tuner and a separate electronic device provides a second tuner (e.g., a Video Cassette Recorder) that has the ability to demodulate ATSC signals, QAM signals, and/or NTSC signals. As will be described in greater detail below with reference to FIG. 2, the tuner 104 provides the processor 110 (or the processor 110 can retrieve) information about a digital signal (e.g., ATSC signals) as the digital signal is demodulated. The processor 110 utilizes the information about the digital signal to determine a quality of the digital signal or to give an indication of the quality of the digital signal. The information about the digital signal is compared to a threshold level by the processor 110 to determine if the digital signal should be output for display or if the processor 110 should stop outputting the digital signal and switch over to outputting a corresponding second television signal (e.g., a corresponding digital signal or analog signal). For example, if a value of a variable obtained from the information about the digital signal is less than the threshold level, the processor 110 will stop outputting the digital signal and start outputting a corresponding analog signal. If such a determination is made, the processor 110 sends a signal 112 to the tuner 104 instructing the tuner 104 to demodulate the corresponding analog signal. The tuner 104 then outputs the analog signal as the transport stream 106, which is processed and output for display by the system on chip 108. Advantageously, this provides a system for switching from a digital signal to a corresponding analog signal when the quality of the digital signal has degraded enough, for example, such that the picture is only partially displayed, such that the sound is broken or such that the picture and sound are not displayed at all. Upon switching to the corresponding analog signal, a person watching the television will not miss the program currently being watched due to a lack of digital signal quality.

Figure 2:
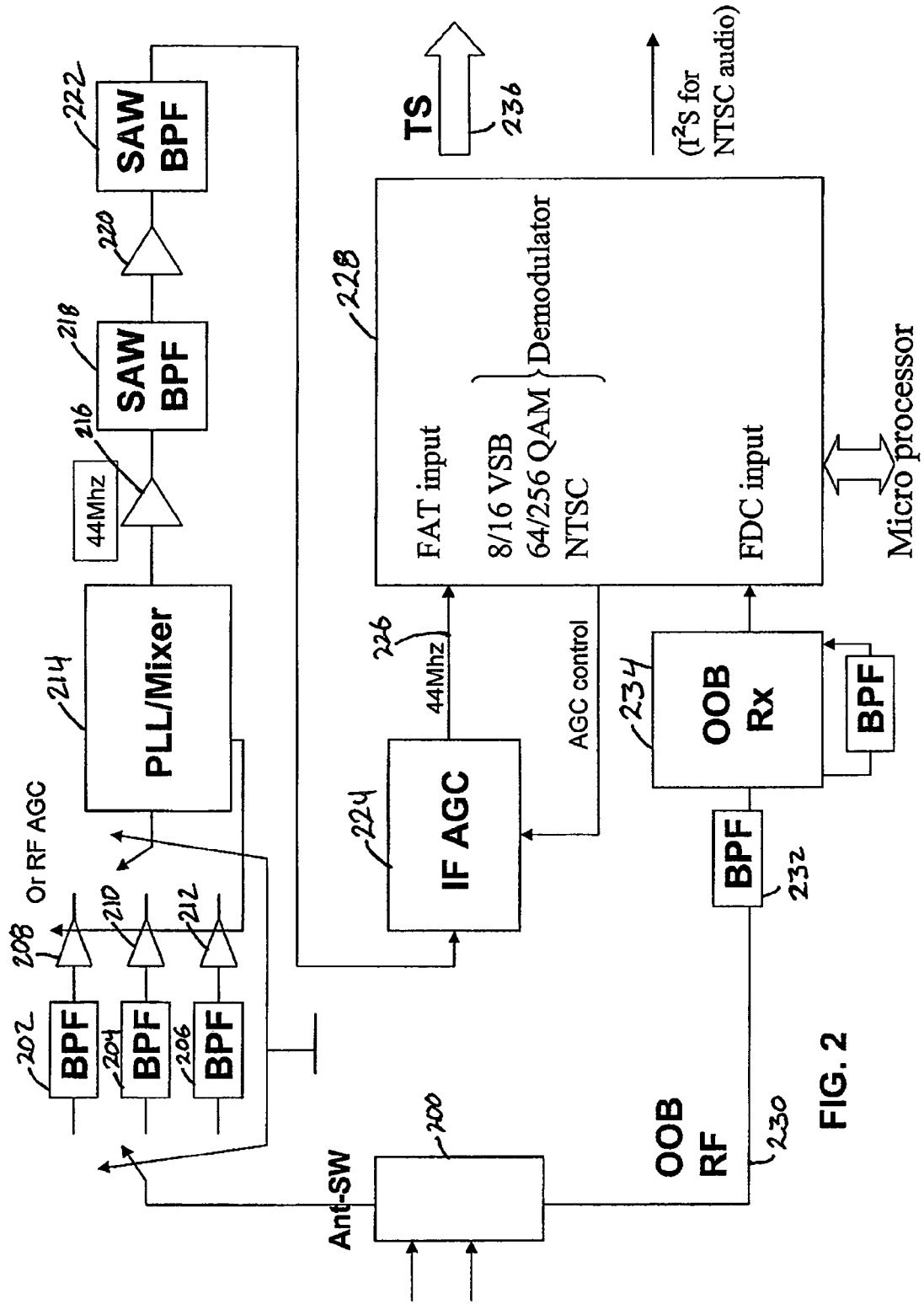
FIG. 2 is a block diagram illustrating a hardware configuration of a tuner in accordance with one embodiment.

Referring to FIG. 2 a block diagram is shown illustrating a hardware configuration of a tuner in accordance with one embodiment. Shown is an antenna switch 200, a first band pass filter 202, a second band pass filter 204, a third band pass filter 206, a first amplifier 208, a second amplifier 210, a third amplifier 212, a mixer 214, a fourth amplifier 216, a first surface acoustic wave (SAW) filter 218, a fifth amplifier 220, a second SAW filter 222, a voltage controlled amplifier 224, a forward application transfer input 226, a demodulator 228, an out of band signal (OOB) 230, an OOB band pass filter 232, OOB Rx 234 and a transport stream 236.

The antenna switch 200 is electrically coupled to the first band pass filter (BPF) 202, the second BPF 204, and the third BPF 206 through a switch. The first BPF 202 is electrically coupled to the first amplifier 208. The second BPF 204 is electrically coupled to the second amplifier 210. The third BPF 206 is electrically coupled to the third amplifier 212. The first amplifier 208, the second amplifier 210 and the third amplifier are electrically coupled to the mixer 214 through a switch. The mixer 214 is electrically coupled to the fourth amplifier which is electrically coupled to the first SAW filter 218. The first SAW filter 218 is electrically coupled to the fifth amplifier 220 which is coupled to the second SAW filter 222. The second SAW filter 222 is coupled to the voltage controlled amplifier 224 which is coupled to the demodulator 228.

The antenna switch 200 is also electrically coupled to the OOB BPF 232 which is electrically coupled to the out of band receiver (OOB Rx) 234. The OOB Rx 234 is electrically coupled to the demodulator 228.

In operation, the antenna switch 200 receives an input signal. The input signal is feed through a switch into the first band pass filter 202, the second band pass filter 204 or the third band pass filter 206. In one embodiment, the first band pass 202 filter is used to filter the very high frequency (VHF) low band (e.g., channels 2-6), the second band pass filter 204 is used to filter the VHF high band (e.g., channels 7-13) and the third band pass filter 206 is used to filter the ultra high frequency (UHF) band (e.g., channels (14-69). Generally, only one of the band pass filters is used at a given time. The selection of the band pass filter is controlled by the processor 110 (shown in FIG. 1) and is determined by the channel that is selected for output to the television screen. For example, following the above example, when channel three is selected, the first band pass filter 202 is selected by the processor 110. The output of each of the band pass filters is fed into one of the RF amplifiers (i.e., the first amplifier 208, the second amplifier 210 and the third amplifier 212). The RF amplifiers are also controlled by the processor 110. The RF input signal from one of the RF amplifiers is received by the mixer 214. The mixer 214 includes a phase lock loop synthesizer to generate a local oscillator signal. The local oscillator signal is mixed with the RF signal to drop the frequency of the RF signal down to 44 MHz. The RF signal is then input into the series of amplifiers and band pass filters (i.e., the fourth amplifier 216, the first SAW filter 218, the fifth amplifier 220, and the second SAW filter 222). The RF signal is then received by the voltage controlled amplifier 224. The gain of the voltage controlled amplifier 224 is controlled by the demodulator 228 by sending an automatic gain control signal that controls the amplitude of the RF signal the demodulator 228 receives. The input into the demodulator 228 is, in one embodiment, a 44 MHz intermediate frequency (IF) RF signal. The RF signal that is input into the demodulator 228 is then digitized and demodulated. The digitized signal is then output by the demodulator over the transport stream 236 (e.g., a standard 8 bit wide interface).

Within the demodulator 228, there are a large number of status registers that can be read by the processor 110 when demodulating a digital signal. The status registers give the processor 110 information that can be used to determine the quality of the received digital signal, or can be used to give an indication of the quality of the received digital signal. For example, inside the demodulator is a Reed Solomon (RS) decoder that has the capability to correct up to ten errors per RS block of data. The RS decoder can estimate the signal to noise ratio of the digital signal and the error rate before and after the signal goes into the RS decoder. This is used to determine the quality of the digital signal or give an indication of the quality of the digital signal. There is also an adaptive equalizer that cancels multipath interference. Coefficients of the adaptive equalizer can be monitored to determine a quality of the digital signal. When the coefficients are stable, the digital signal is more than likely stable, however, when the values of the coefficients are changing this is an indication that the digital signal is experiencing interference or is not stable. Thus, in order to determine the quality of a digital signal or an indication of the quality of the digital signal the registers on the demodulator 228 are read to acquire information about the digital signal. For example, the signal to noise ratio, the pre and post RS bit error rate, the equalizer coefficients, the automatic gain control level or the symbol error detection can all be used individually or in combination to determine the quality of the digital signal or to give an indication of the quality of the digital signal. Additionally, for example, video decoder stall and/or error count are used to determine a quality of the digital signal.

In operation, one or more of the values of the above mentioned registers are compared to a threshold level. When the values of the registers deviate from the maximum or minimum value, the processor 110 will change channels from the currently displayed digital channel over to a corresponding second channel. This reduces the amount of programming that is missed while watching a digital channel that is experiencing a lack of signal quality and thus is not being properly displayed. The threshold levels are determined by evaluating the available variables for a particular system and adjusting and monitoring the system performance. The threshold levels can also be set by a user specifying what reception level of the signal is acceptable.

Optionally, the threshold level can be adjusted based upon the type of programming that is currently on the channel being watched. The programming information is retrieved, in one embodiment, from a program guide. For example, the threshold level for a sitcom may be set higher than the threshold level for a sporting event. Similarly, the threshold level can be different for different channels. For example, content highly valued by the user may be viewed more critically and switching quickly between channels will be preferred. For example, only minor interrupts may be acceptable for some programs, but not acceptable for high action programs such as sports or action movies.

The corresponding second channel is an analog or digital television signal. The corresponding second channel is supplied either on an alternate channel from the same source or from an alternate source. In one exemplary embodiment, a cable or satellite provider will have a digital channel and a corresponding analog channel. When the values at the variables of the digital signal read from the registers reach or exceed threshold value, the corresponding analog channel will be switched to.

Alternatively, the digital signal is received from a cable provider and the corresponding second signal is received terrestrially or from a satellite provider. The corresponding signal can be a digital signal or an analog signal. Other combinations of the types of signals and the signal source not specifically described are also contemplated in alternative embodiments.

In one embodiment, the television includes two tuners such that while the analog channel is being displayed the digital signal can still be monitored. When the digital signal returns to an acceptable level (i.e., above the threshold level), the processor 110 switches the television back to outputting the digital channel. Alternatively, there is only one tuner and the processor 110 checks the quality of the digital signal in response to a user request, for example, the user could request to check the quality of the digital signal during a commercial. Still alternatively, the second tuner is a video cassette reader (VCR) that is connected to the television. This allows the VCR to act as the NTSC tuner (i.e., analog tuner) while the demodulator within the television monitors the digital signal. When the digital signal has returned to a level above the threshold, the processor 110 switches back to displaying the digital channel. Some synchronization may be required to keep both the analog and the digital video frames synchronized or close to synchronized.

In another embodiment, the television contains two tuners: a digital tuner and an analog tuner. In operation when the digital tuner is demodulating a digital signal, the processor 110 is utilizing the information about the digital signal received from the demodulator to determine if the digital signal can be properly displayed. At the same time, the analog tuner is demodulating an analog signal that corresponds to the digital signal or a second digital tuner is demodulation a second digital signal that corresponds to the first digital signal. In this manner, when the processor 110 determines that the digital signal can not be properly displayed, or that it is likely the digital signal can not be displayed, the processor 110 stops outputting the digital signal and outputs e.g., the analog signal. Because the analog tuner is already demodulating the analog signal (i.e., the analog tuner is pre-tuned), this provides for an immediate switch (or a switch with very little delay) from the digital signal to the analog signal. Similarly, when switching back to the digital signal from the analog signal, there is little or no delay.

The OOB RF path is also routed into the demodulator. The information contained in the OOB signal is used for decryption of the digital signals. The operation of the OOB RF path is well known to one of ordinary skill in the art.

While FIGS. 1 and 2 have been described in reference to a television it should be understood that this is one exemplary embodiment. Alternatively, for example, a cable box, a digital video recorder (DVR), a personal video recorder (PVR) or satellite box can be implemented.

For example, a DVR can include two tuners. The DVR can be recording a digital signal. When the digital signal is interrupted or degraded the DVR can switch over to recording a corresponding analog signal. Similarly when the DVR receives signals from multiple sources (e.g., terrestrial and cable) the DVR records, for example, a cable digital signal. If the cable signal is interrupted or degraded, the DVR can switch over to recording a corresponding terrestrial digital signal. When the DVR determines the cable digital signal is no longer interrupted or degraded, the DVR switches back to recording the cable digital signal. In this manner, little or no programming is lost during the recording even when interruption in one of the signals is present.

In another embodiment, the DVR records both a digital signal and a corresponding analog signal. When a user wishes to replay the content, the content is edited (either manually or automatically) so that the content is played back as contiguous and clean as possible. For example, the digital signal is displayed unless portions of the digital signal are degraded during which time the analog signal is displayed. Using a moving buffer capability the editing can be done in real time.

Figure 3:
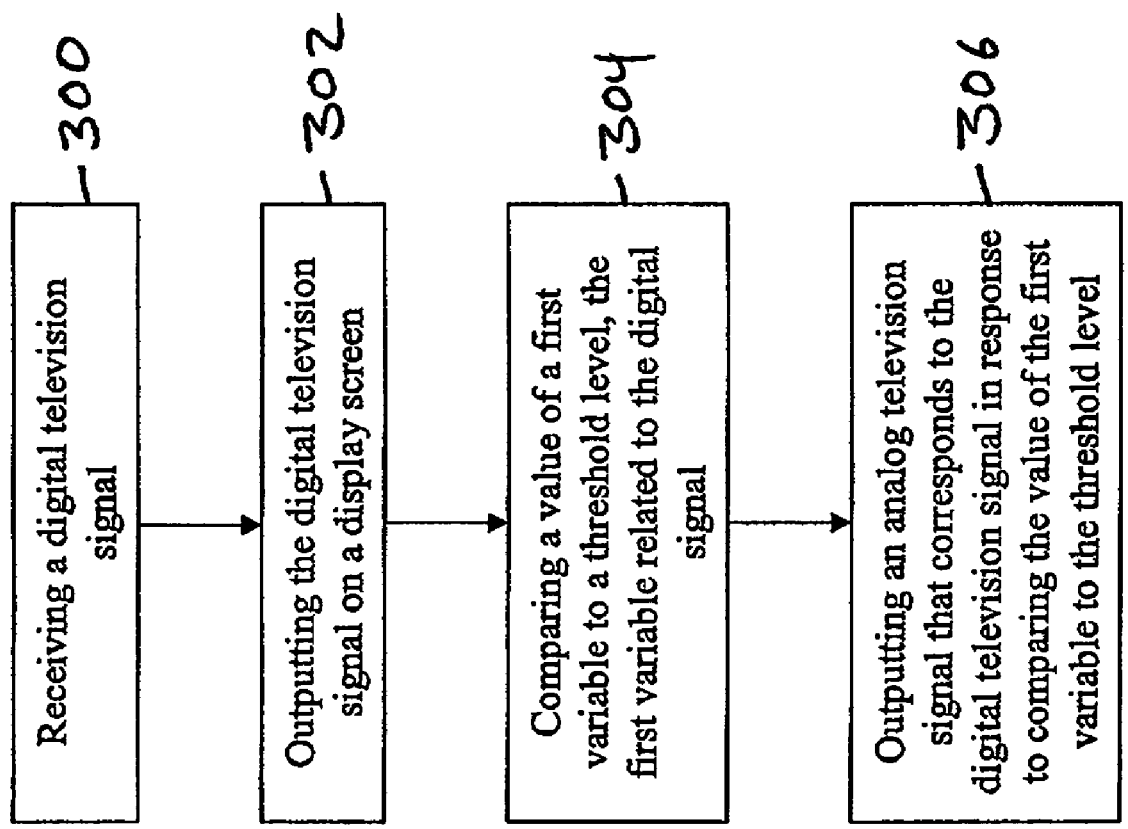
FIG. 3 is a flow diagram illustrating a method of switching between a first television signal and a second television signal in accordance with one embodiment.

Referring to FIG. 3 a flow diagram is shown illustrating a method of switching between a first television signal and a second television signal in accordance with one embodiment.

In step 300, a first television signal is received. The first television signal is, for example, an ATSC signal or a QAM signal. The first signal is received, for example, at a cable box a DVR, or a television. Following, in step 302, the first signal is output for display on a display screen or output to a memory device for storage, for example, storage on a hard drive of a DVR.

Next, in step 304, a value of a first variable is compared to a threshold level. The first variable is related to the first television signal. In one embodiment, the value of the variable is retrieved from registers of a digital demodulator of the television or the cable box. The value of the variable gives the television information about the quality of the digital signal or gives an indication as to the likely quality of the first signal. If the variable indicates that the first signal is a good quality, the variables continue to be monitored without a change in the output of the first signal.

Following, in step 306, the television or cable box outputs a second television signal that corresponds to the digital television signal in response to comparing the value of the first variable to the threshold level. While outputting the second television signal, the first television signal is still monitored such that the system can switch back to the first television signal if the value of the first variable returns to an acceptable level as when compared to the threshold level.

In order to switch between, for example, a digital signal and a corresponding analog signal, the controller (shown in FIG. 1) will be aware of how the digital channels correspond to the analog channels. In one embodiment, the controller retrieves this information from a program guide. Alternatively, the information is gathered from the Program and System Information Protocol (PSIP). The PSIP is data that is transmitted along with a station's digital television (DTV) signal that tells DTV Receivers information about the station and what is being broadcast. One function of PSIP is to provide a method for DTV receivers to identify a DTV station and to determine how a receiver can tune to it. PSIP identifies both the DTV channel and the associated NTSC (analog) channel. It helps maintain the current channel branding because DTV receivers will electronically associate the two channels making it easy for viewers to tune to the DTV station even if they do not know the channel number.

Alternatively, if the PSIP is not available (or inaccurate) a user can manually input the mapping of the digital channels to the analog channels. Additionally, if the PSIP is inaccurate, the user can edit the one or more incorrect channel mappings.

Figure 4:
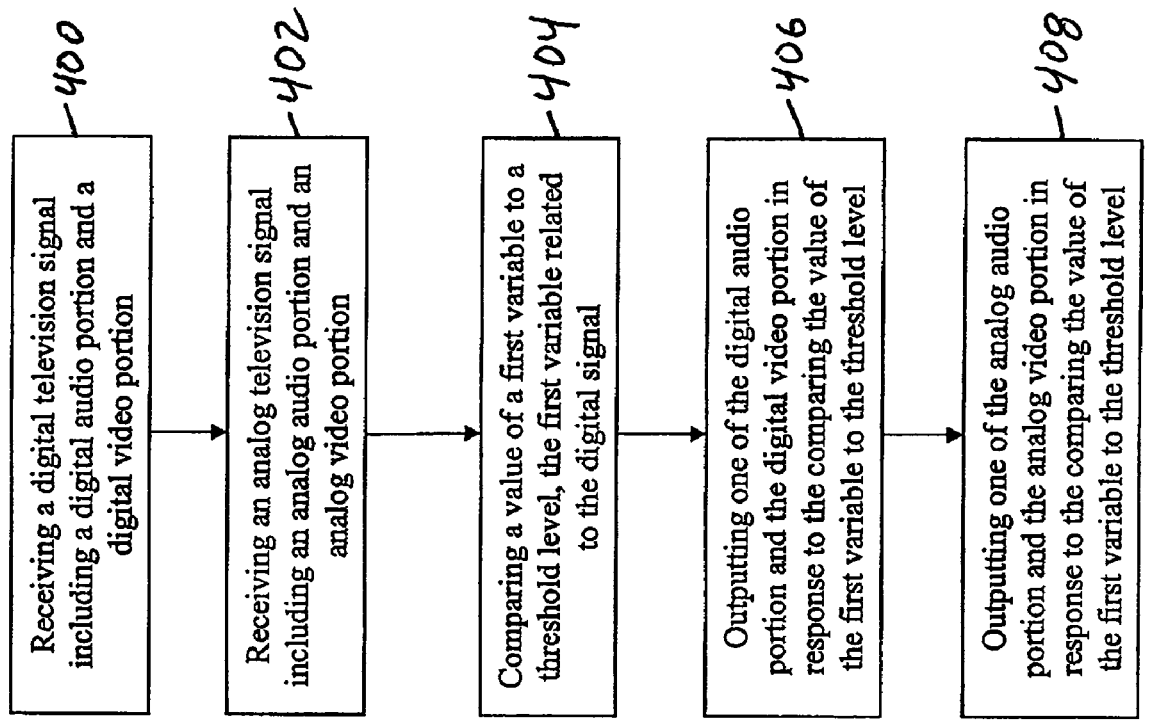
FIG. 4 is a flow diagram illustrating a method of switching between a digital and analog television signal in accordance with another embodiment.

Referring to FIG. 4 a flow diagram is shown illustrating a method of switching between a first television signal and a second television signal in accordance with another embodiment.

In step 400, a first television signal including a first audio portion and a first video portion is received, for example, by a television, a cable box, or a DRV.

In step 402, a second television signal including a second audio portion and a second video portion is received by the television.

Next is step 404, a value of a first variable is compared to a threshold level. The first variable is related to the first signal. The value of the first variable gives an indication as to the quality of the first signal. If the variable indicates that the first signal is a good quality, the variables continue to be monitored without a change in the output of the first signal.

In step 406, one of the first audio portion and the first video portion is output in response to the comparing the value of the first variable to the threshold level. In step 408, one of the second audio portion and the second video portion is output in response to the comparing the value of the first variable to the threshold level. This allows, for example, the first video portion of a first signal to be displayed while the second audio portion of the second signal is output. Advantageously, when the first audio portion is below a threshold, and thus, more than likely not a good quality signal, the second audio signal is output instead. While outputting any part of the second television signal, the first television signal is still monitored such that the system can switch back to the first television signal if the value of the first variable returns to an acceptable level as when compared to the threshold level.

The first television signal and the second television signals can be either analog or digital signals. Additionally, the first television signal and the second television signal can be received from one or more sources. As referred to herein, the outputting of a signal can be either for display on a display screen or for storage in a memory device, such as, for example, a hard drive on a computer or DVR.

While the invention herein disclosed has been described by means of specific embodiments and applications thereof, other modifications, variations, and arrangements of the present invention may be made in accordance with the above teachings other than as specifically described to practice the invention within the spirit and scope defined by the following claims.

We claim:

1. A method comprising:
    receiving a first television signal that conforms to an Advanced Television Systems Committee standard;
    outputting the first television signal;
    comparing a value of a first variable that includes an equalizer tap coefficient to a threshold level, the first variable related to the first television signal; and
    outputting a second television signal that corresponds to the first television signal in response to comparing the value of the first variable to the threshold level.

2. The method of claim 1 further comprising:
    monitoring the first television signal while outputting the second television signal; and
    outputting the first television signal in response to the value of the first variable returning to an acceptable level as compared to the threshold level.

3. The method of claim 1 wherein the value of the first variable includes an automatic gain control level.

4. The method of claim 1 wherein the value of the first variable includes a bit error rate.

5. The method of claim 1 wherein the value of the first variable includes an error correction status.

6. A method comprising:
    receiving a first television signal that conforms to an Advanced Television Systems Committee standard including a first audio portion and a first video portion;
    receiving a second television signal including a second audio portion and a second video portion;
    comparing a value of a first variable that includes an equalizer tap coefficient to a threshold level, the first variable related to the first television signal;
    outputting one of the first audio portion and the first video portion in response to the comparing the value of the first variable to the threshold level; and
    outputting one of the second audio portion and the second video portion in response to the comparing the value of the first variable to the threshold level.

7. The method of claim 6 further comprising:
monitoring the first television signal while outputting the one of the second audio portion and the second video portion; and
outputting the first television signal, including the first audio portion and the first video portion in response to the value of the first variable returning to an acceptable level as compared to the threshold level.

8. The method of claim 6 wherein the value of the first variable includes an automatic gain control level.

9. The method of claim 6 wherein the value of the first variable includes a bit error rate.

10. The method of claim 6 wherein the value of the first variable includes an error correction status.

11. An apparatus comprising:
a tuner for demodulating a first television signal that conforms to an Advanced Television Systems Committee standard; and
a controller electronically coupled to the tuner, the controller configured to compare a value of a first variable that includes an equalizer tap coefficient to a threshold level, the value of the first variable related to a quality of the first television signal;
wherein the controller switches from outputting the first television signal to outputting a second television signal that corresponds to the first television signal in response to comparing the value of the first variable to the threshold level.

12. The apparatus of claim 11 further comprising a second tuner for demodulating the second television signal.

13. The apparatus of claim 11 further comprising a receiver for receiving the second television signal from a remote tuner.

14. The apparatus of claim 11 wherein the value of the first variable includes an automatic gain control level.

15. The apparatus of claim 11 wherein the value of the first variable includes a bit error rate.

16. The apparatus of claim 11 wherein the value of the first variable includes an error correction status.

17. An apparatus comprising:
a tuner module configured to demodulate a first television signal that is quadrature amplitude modulated and a second television signal that corresponds to the first television signal; and
a controller electronically coupled to the tuner module, the controller configured to compare a value of a first variable that includes an equalizer tap coefficient to a threshold level, the value of the first variable related to a quality of the first television signal;
wherein the controller switches from outputting the first television signal to outputting the second television signal that corresponds to the first television signal in response to comparing the value of the first variable to the threshold level.

* * * * *

UNITED STATES PATENT AND TRADEMARK OFFICE
CERTIFICATE OF CORRECTION

| | | |
|---|---|---|
| PATENT NO. | : 7,551,229 B2 | Page 1 of 1 |
| APPLICATION NO. | : 10/917989 | |
| DATED | : June 23, 2009 | |
| INVENTOR(S) | : Ozaki et al. | |

It is certified that error appears in the above-identified patent and that said Letters Patent is hereby corrected as shown below:

On the cover page,

[*] Notice:   Subject to any disclaimer, the term of this patent is extended or adjusted under 35 USC 154(b) by 578 days Delete the phrase "by 578 days" and insert -- by 741 days --

Signed and Sealed this

Tenth Day of August, 2010

David J. Kappos
*Director of the United States Patent and Trademark Office*